United States Patent [19]

Kennedy et al.

[11] Patent Number: 5,952,955
[45] Date of Patent: Sep. 14, 1999

[54] COMPENSATION FOR RADAR PATH LENGTH VARIATION AND PHASE ERROR

[75] Inventors: Thomas A. Kennedy, Manhattan Beach; Kapriel V. Krikorian, Agoura; Robert A. Rosen, Agoura Hills; Ralston S. Robertson, Northridge; Garry N. Hulderman, Riverside, all of Calif.

[73] Assignee: Raytheon Company, Lexington, Mass.

[21] Appl. No.: 08/997,521

[22] Filed: Dec. 23, 1997

[51] Int. Cl.$^6$ .................................................. G01S 13/90
[52] U.S. Cl. ............................ 342/25; 342/102; 342/159; 342/194; 342/174
[58] Field of Search .............................. 342/25, 102, 159, 342/161, 162, 165, 173, 174, 194, 195, 198, 203

[56] References Cited

U.S. PATENT DOCUMENTS

| | | | |
|---|---|---|---|
| 3,725,915 | 4/1973 | Herman et al. | 342/25 |
| 4,219,811 | 8/1980 | Herman et al. | 342/25 |
| 4,227,194 | 10/1980 | Herman et al. | 342/25 |
| 4,339,752 | 7/1982 | Williams et al. | 342/25 |
| 5,160,932 | 11/1992 | Bull | 342/25 |
| 5,489,906 | 2/1996 | McCord | 342/25 |

*Primary Examiner*—John B. Sotomayor
*Attorney, Agent, or Firm*—Leonard A. Alkov; Glenn H. Lenzen, Jr.

[57] ABSTRACT

Methods that compensate for phase errors caused by path length variations in a radar system, and that compensate for relative phase errors in upconvertor and downconverter references employed in the radar system. One method samples a signal reflected from a duplexer through a receiver during the time the radar pulse is transmitted. The signal reflected from the duplexer is compared to a radar echo pulse on a single pulse basis. The phase of the sampled signal is subtracted from the phase of the received radar echo pulse reflected to determine the phase error. In a second method, multiple samples are collected during the time each radar pulse is transmitted. Samples of the signal reflected from the duplexer and the radar echo pulse are compared on a pulse to pulse basis. The phase differences are averaged across the pulse duration. The averaged phase differences are integrated on a pulse to pulse basis to determine the phase error.

4 Claims, 2 Drawing Sheets

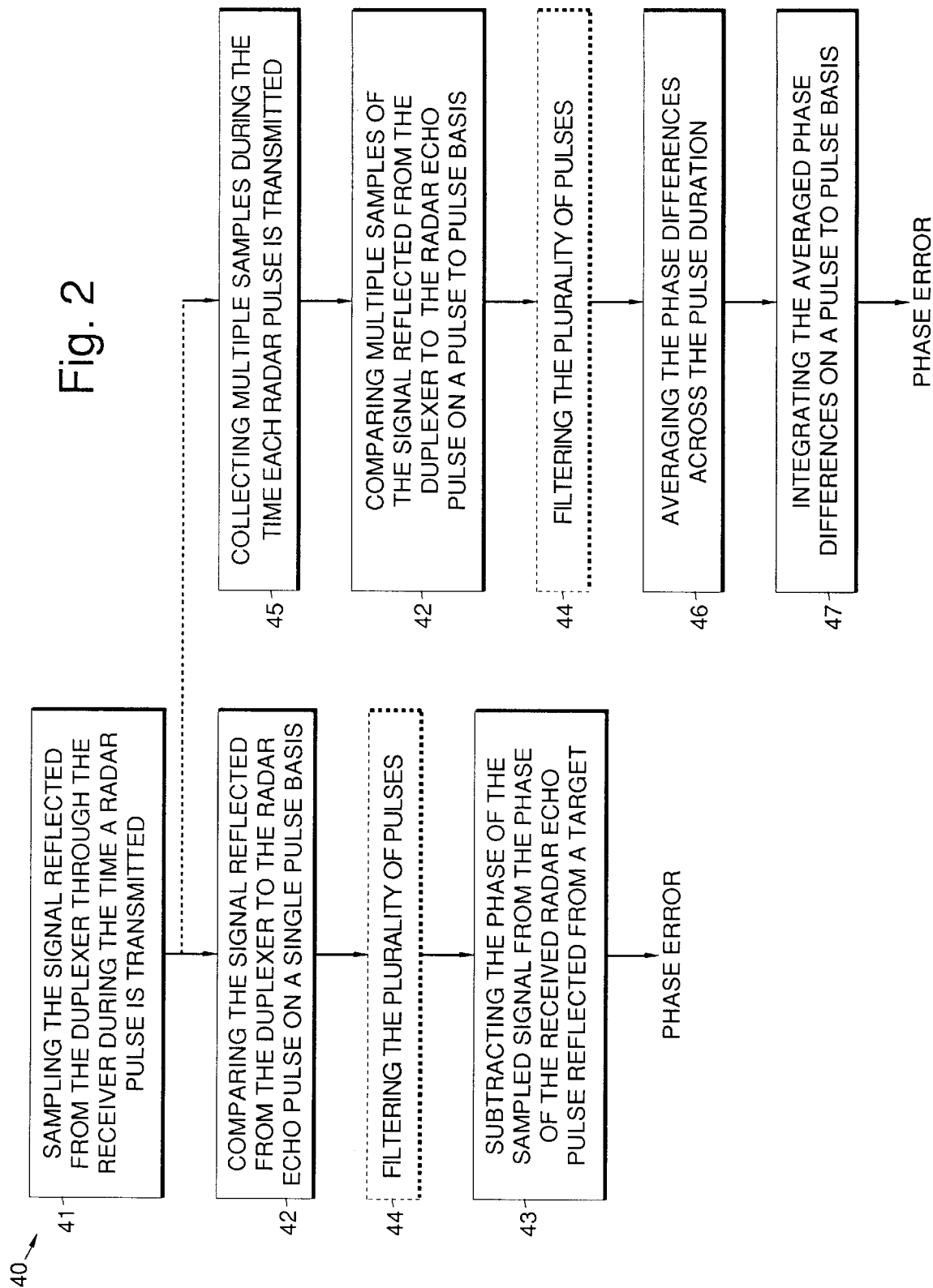

COMPENSATION FOR RADAR PATH LENGTH VARIATION AND PHASE ERROR

BACKGROUND

The present invention relates to radar systems, and more particularly, to signal processing, methods for use in a synthetic array radar system that compensate for phase errors caused by path length variations within a radar system.

Conventional radar systems do not compensate for internal path length variation and phase errors resulting from these variations. Consequently, conventional radar systems have relatively tight requirements as to the amount of vibration that is permitted between components and permissible internal path length variations. Therefore, additional cost and engineering, is required to develop and manufacture such radar systems.

Accordingly, it is an objective of the present invention to provide for signal processing methods for use with a radar system that compensate for phase errors caused by path length variations within a radar system. It is a further objective of the present invention to provide for signal processing methods that alleviate some of the stringent manufacturing requirements imposed upon conventional radar systems relating to vibration and internal path length variations.

SUMMARY OF THE INVENTION

To meet the above and other objectives, the present invention provides for methods that compensate for phase errors caused by path length variations within a radar system. In addition, the methods compensate for relative phase errors in an upconverter reference and downconverter reference employed in the radar system. The methods are especially useful in millimeter wave radar where small path length errors can lead to large phase errors. The present invention requires minimal additional hardware since the analog to a digital converter in the receiver of the radar system is used to make the phase compensation measurement.

More specifically, one method samples 41 a signal reflected from a duplexer through the receiver during the time the radar pulse is transmitted. The signal reflected from the duplexer is compared to the radar echo pulse on a single pulse basis. The phase of the sampled signal is subtracted from the phase of the received radar echo pulse reflected from a target to determine the phase error.

In a second method, multiple samples are collected during the time each radar pulse is transmitted. Samples of the signal reflected from the duplexer and the radar echo pulse are compared on a pulse to pulse basis. The phase differences are averaged across the pulse duration. The averaged phase differences are integrated on a pulse to pulse basis to determine the phase error.

The present invention compensates for the relative phase errors and relaxes tight requirements on vibration between radar system components and internal path length variation. The present invention improves the performance of radar modes, and in particular, the quality of synthetic array radar (SAR) images, and/or allows more flexibility in the design of the radar system, by permitting the use of a flexible cable to transfer the reference signal output by the downconverter reference in the receiver. In addition, the present invention eliminates the need for additional sensors to estimate internal path length differences and phase errors within the radar system.

The present invention may be employed with radar systems used on moving platforms. Such radar systems include airborne fighter radar systems, such as those employed on F-15 and F/A-18 aircraft, and commercial systems such as automotive radar systems, and the like.

BRIEF DESCRIPTION OF THE DRAWINGS

The various features and advantage of the present invention may be more readily understood with reference to the following detailed description taken in conjunction with the accompanying drawings, wherein like reference numerals designate like structural elements, and in which:

FIG. 2 is a flow diagram illustrating signal processing methods in accordance with the principles of the present invention.

DETAILED DESCRIPTION

Figure 1:
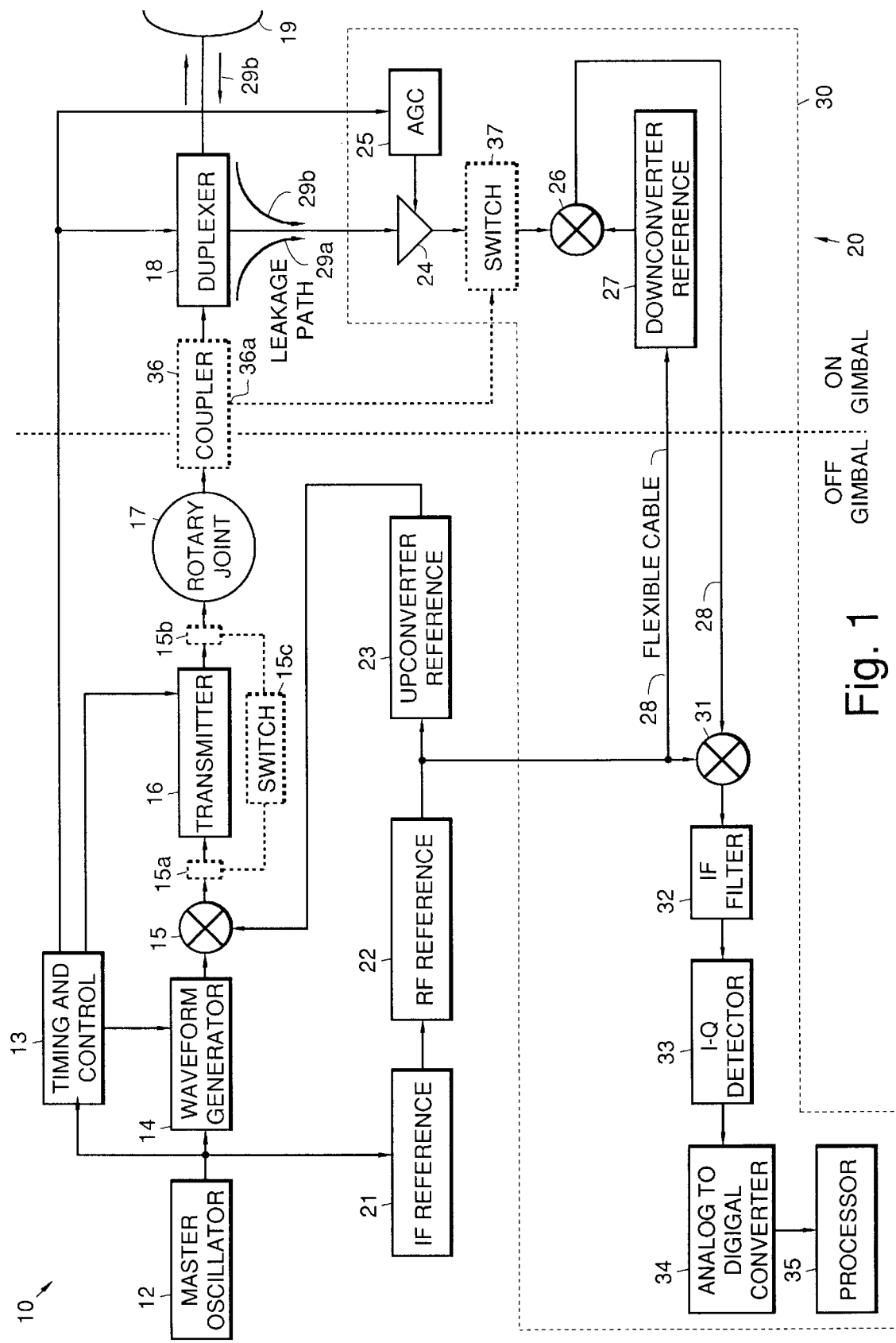
FIG. 1 is a block diagram illustrating an exemplary radar system employing a signal processing method in accordance with the principles of the present invention that compensates for phase errors caused by path length variations within a radar system.

Referring to the drawing figures, FIG. 1 is a block diagram illustrating an exemplary millimeter wave radar system 10 employing a signal processing method 40 in accordance with the principles of the present invention that compensates for phase errors caused by path length variations within a radar system 10. The radar system 10 has a master oscillator 12 that provides an output signal to timing and control circuitry 13, a waveform generator 14 and an intermediate frequency (IF) reference 21. The waveform generator 14 is coupled to a first input of a multiplier 15 whose output is applied to a transmitter 16. The timing and control circuitry 13 is coupled to the transmitter 16.

The transmitter 16 is coupled by way of a rotary joint 17 at the junction of a gimbal 20 on which a duplexer 18, a radar antenna 18, a low noise amplifier 24, an automatic gain control (AGC) circuit 25, a second multiplier 26 and a receiver downconverter reference 27 are disposed. The duplexer 18 is coupled between the rotary joint 17 and the radar antenna 18 and allows radar pulses transmitted by the transmitter 16 to pass to the antenna 19, and echo pulses 29b received by the antenna 19 to be routed to a receiver 30 of the radar system 10.

The receiver 30 comprises the low noise amplifier 24, the automatic gain control circuit 25, the second multiplier 26 and the receiver downconverter reference 27 that are disposed on the gimbal 20. The balance of the receiver 30 disposed off of tile gimbal 20 comprises a third multiplier 31, all intermediate frequency (IF) filter 32, an I-Q detector 33, an analog to digital converter 34 and a processor 35.

The duplexer 18 is also coupled to the low noise amplified 24. The timing and control circuitry 13 is coupled to the automatic gain control circuit 25 and controls the gain of the low noise amplifier 24. Automatic gain control is implemented by changing the bias on the low noise amplifier 24. The output of the low noise amplifier 24 is coupled to a first input of the second multiplier 26, while the output of the receiver downconverter reference 27 is coupled to a second input of the second multiplier 26. The second multiplier 26 is coupled to the portion of tile receiver 30 that is disposed off of the gimbal 20.

More specifically, the second multiplier 26 is coupled to a first input of the third multiplier 31 whose second input is coupled to an output of the RF reference 22. The output of the third multiplier 31 is coupled through the intermediate frequency (IF) filter 32, the I-Q detector 33, and the analog to digital converter 34 to the processor 35, all of which are disposed off of the gimbal 20. The output of the intermediate frequency (IF) reference 21 is coupled to the I-Q detector 33.

FIG. 2 is a flow diagram illustrating exemplary signal processing methods 40 in accordance with the principles of the present invention that may be used in the radar system 10 shown in FIG. 1. The method 40 directly measures the phase error due to path length variations within the radar system 10 and compensates for this error. Path length variations can occur due to relative motion between components of the radar system 10 that are disposed on the gimbal 20 those that are disposed off the gimbal 20, especially when they are connected by flexible cables 28.

In particular, the rotary joint 17 and the flexible cable 28 that is coupled to the receiver downconverter reference 27 are the main sources of path length variation. Consequently, a signal 29a is reflected from the duplexer 18 into the receiver 30 (along the leakage path) and the radar echo pulse 29b is also coupled by way of the duplexer 18 to the receiver 30.

Referring to FIG. 2, the phase error is determined by sampling 41 the signal 29a reflected from the duplexer 18 through the receiver 30 during the time a radar pulse is transmitted. The signal 29a reflected from the duplexer 18 is compared 42 to the radar echo pulse 29b on a single pulse basis. The phase error is determined by subtracting 43 the phase of the sampled signal 29a from the phase of the received radar echo pulse 29b reflected from a target in the processor 35.

To reduce the noise on the signal 29a reflected from the duplexer 18, a plurality of pulses may be filtered 44 through the IF filter 32 to obtain a smoothed estimate of the phase. The processor 35 has memory (not shown) for storing a plurality of radar pulses, and the effect of the delay caused by the filter 32 can readily be eliminated. If multiple samples 42 are collected 45 during the time each radar pulse is transmitted, corresponding samples (of the signal 29a reflected from the duplexer 18 and the radar echo pulse 29b) are compared 42 on a pulse to pulse basis band the phase differences are averaged 46 across the pulse duration. The phase corrections are then obtained by integrating 47 the averaged phase differences on a pulse to pulse basis.

If reflection from a radome (not shown) couples significantly into the receiver 30, it could disturb the phase measurement. A solution to this problem is to use a directional coupler 36 disposed between the rotary joint 17 and the duplexer 17 and connect an isolated port 36a of the coupler 36 to a switch 37 behind the low noise amplifier 24. The switch 37 is connected to the coupler 36 during the phase measurement and to the low noise amplifier 24 during reception of the radar echo pulse 29b from the target.

An alternative implementation is also provided by the present invention that eliminates the possibility of saturation during the phase measurement. In this case, an exciter signal Output from the mixer 15 that is coupled around the transmitter 16 using first and second couplers 15a, 15b and a switch 15c as shown in FIG. 1 may be used after a radar pulse is transmitted but before the radar echo pulse 29b arrives to derive the phase errors. Thus, the phase of the exciter signal is compared to the phase of the received echo signal 29b to determine the phase error in the manner described above using the actual transmitted pulse.

Thus, signal processing methods have been disclosed for use in a synthetic array radar system that compensate for phase errors caused by path length variations within the radar system. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A signal processing method for use with a radar system compromising a duplexer 18 that couples transmitted radar pulses between a transmitter and an antenna 19 and between the antenna and a receiver that compensates for radar path length variations and phase errors, said method comprising the steps of:

sampling a signal reflected from the duplexer through the receiver 30 during the time the radar pulse is transmitted;

comparing the signal reflected from the duplexer to the radar echo pulse on a single pulse basis; and subtracting the phase of the sampled signal from the phase of the received radar echo pulse reflected from a target to determine the phase error.

2. The method of claim 1 further comprising the step of:

filtering a plurality of pulses after the comparison step to reduce the noise on the signal reflected from the duplexer and to determine a smoothed estimate of the phase error.

3. A signal processing, method for use with a radar system comprising a duplexer that couples transmitted radar pulses between a transmitter and an antenna and between the antenna and a receiver that compensates for radar path length variations and phase errors, said method comprising the steps of:

collecting multiple samples during the time each radar pulse is transmitted;

comparing samples of the signal reflected from the duplexer and the radar echo pulse on a pulse to pulse basis;

averaging the phase differences across the pulse duration; and integrating the averaged phase differences on a pulse to pulse basis to determine the phase error.

4. The method of claim 3 further comprising the step of:

filtering a plurality of pulses after the comparison step to reduce the noise on the signal reflected from the duplexer and to determine a smoothed estimate of the phase error.

* * * * *